United States Patent

[11] 3,627,657

[72] Inventors Ugo Nistri;
Silvio Vargiu; Bettino Passalenti; Osvaldo Fiorani, all of Milan, Italy
[21] Appl. No. 838,332
[22] Filed July 1, 1969
[45] Patented Dec. 14, 1971
[73] Assignee Societa Italiana Resine S.p.A.
Milan, Italy
[32] Priority July 15, 1968
[33] Italy
[31] 18977 A/68

[54] UNSATURATED POLYESTER COMPOSITIONS
6 Claims, No Drawings
[52] U.S. Cl................................................204/159.15,
204/159.23, 260/45.75 CU, 260/863
[51] Int. Cl...........................................................C08f 45/56,
C08f 1/00, B01s 1/00
[50] Field of Search........................................... 260/45.75
CU, 863; 204/159.23, 159.15

[56] References Cited
UNITED STATES PATENTS
3,360,589 12/1967 Raichle et al................. 260/45.75
2,949,361 8/1960 Agens........................... 204/159.23

*Primary Examiner*—Murray Tillman
*Assistant Examiner*—Richard B. Turer
*Attorney*—Sughrue, Rothwell, Mion, Zinn & Macpeak

ABSTRACT: There is provided, stable and photochemically hardenable unsaturated polyester compositions comprising:

a. an unsaturated polyester prepared by mixing (1) a monomer selected from the group consisting of monomers of the acryl and vinyl types with (2) a polycondensation product of a hydroxyl number not below 40, formed from a polycarboxylic and a polyhydroxylic alcohol, wherein the acid or alcohol contains nonaromatic unsaturation, said acryl or vinyl monomer being employed in a quantity of from 20 percent to 70 percent by weight with respect to the polycondensation product, b. a stabilizing system composed of 200 to 800 p.p.m., by weight of the polyester of a phosphite selected from the group consisting of alkyl phosphites and aryl phosphites, and from 10 to 50 p.p.m. of a 6 percent solution of a member selected from the group consisting of copper naphthenate and copper octoate; and c. from 0.1 to 5.0 percent, by weight of said polyester, of a compound selected from the group consisting of benzoin and benzoin derivatives having an alkyl group containing one to eight carbon atoms in the alpha position. Optionally, the polycarboxylic acid can be partially replaced by a saturated dicarboxylic acid.

UNSATURATED POLYESTER COMPOSITIONS

BACKGROUND OF THE INVENTION

This invention relates to compositions of photochemically hardenable unsaturated polyesters.

By unsaturated polyesters we refer to the products obtained by mixing a monomer of the acryl or vinyl type with the product obtained by the polycondensation of a polycarboxylic acid and a polyhydroxy alcohol when a non-aromatic unsaturation is present in either the acid or the alcohol.

It is well known that unsaturated monomers or mixtures thereof with unsaturated polymers can be photochemically polymerized in the presence of light-labile substances, such as carbonyl compounds containing a halogen atom bound to carbon in the alpha position with respect to the carbonyl group, mercaptanes halogenated in the alpha position, nitroso compounds and various organic sulfur derivatives.

However, such compounds are relatively expensive and/or do not give entirely satisfactory results in the photochemical hardening of the compositions comprising unsaturated polyesters and monomers of the acryl or vinyl type. Thus, incompletely hardened or badly colored products may result; moreover, the addition of light-sensitive compounds often makes the unsaturated polyester unstable, with the consequence of short storage periods.

SUMMARY OF THE INVENTION

We have now found how to prepare compositions of unsaturated polyesters which are stable on storage over long periods of time, and which form photochemically hardened, colorless bodies. Such compositions comprise a. an unsaturated polyester as defined above,
b. a stabilizing system comprising 200 to 800 p.p.m., by weight of the polyester of an alkyl phosphite or an aryl phosphite and traces of a copper salt, and
c. as a light-sensitive compound, 0.1 to 5.0 percent, by weight of the polyester, of benzoin or a derivative of benzoin having in the alpha position an alkyl group of one to eight carbon atoms.

Such compositions are hardened by the action of light in the absence of heat or of peroxide compounds; they harden in air without the protective action of paraffins or paraffin waxes currently employed; moreover, they do not require any preliminary separation of the stabilizing system.

DESCRIPTION OF THE PREFERRED EMBODIMENTS

As the aryl or vinyl component of the unsaturated polyester, aryl vinyl compounds are preferred, more particularly styrene. The polycondensation product is preferably formed from a saturated dihydroxylic alcohol and an unsaturated dicarboxylic acid, such as maleic, fumaric, itaconic and citraconic acids. There may also be used modified products which are obtained by adding during polycondensation smaller quantities of monocarboxylic acids or monhydroxylic alcohols, or acids having more than two carboxyl groups in the molecule or alcohols having more than two hydroxyl groups. The unsaturated carboxylic acids may also be replaced in part by equivalent quantities of saturated dicarboxylic acids, such as succinic, adipic, azelaic or phthalic acids.

In the unsaturated polyester the quantity of acryl or vinyl monomer is preferably 20 to 70 percent by weight with respect to the above defined polycondensation product.

It is essential for the purposes of the invention for the polycondensation product to be of a hydroxyl number not lower than 40, preferably of 55 to 75. With hydroxyl numbers lower than 40 the stability periods on storage of the compositions comprising the unsaturated polyester, stabilizing system and benzoin or alkyl derivatives thereof become too short; with hydroxyl numbers above 75, perfectly hardened bodies are obtained.

Unsaturated polyesters of a hydroxyl number within the above defined range are preferably obtained by selecting the relative monomer quantities and adjusting the conditions at the polycondensation stage. It is moreover possible to admix hydroxyl compounds into the polycondensation product in order to bring the hydroxyl number within the desired range. In any case it is convenient for the polycondensation products to have a Gardner viscosity of from T to U, measured at 25° C. in a 66.6 percent by weight styrene solution.

Preferred phosphitic compounds, which are added in amount of 200 to 800 p.p.m., are alkyl phosphites such as trimethyl phosphite and triethyl phosphite, and aryl phosphites, such as triphenylphosphite.

The copper salts are utilized in traces only. Thus, for instance, copper naphthenates or octoates may be used in a 6 percent solution, when a quantity of solution of 10 to 50 p.p.m. of the salt with respect to the unsaturated polyester is added. Quantities below 10 p.p.m. give insufficient stabilizing effects and with quantities exceeding 50 p.p.m. there is a decrease in the storage stability of the unsaturated polyester compositions (see example 11 below).

It should be noted that the mixture of phosphitic compound and copper salt only confers a sufficient stability to compositions of the unsaturated polyester which contain benzoin ($C_6H_5CHOHCOC_6H_5$) or an alkyl derivative thereof. The subsequent examples show that the use of copper compounds and phosphitic compounds separately confers only very short storage stability on the described compositions.

The benzoin or alkyl derivative thereof should be added to the polyester under protection against even indirect light.

The unsaturated polyester compositions according to the invention are stable on storage over a number of months, and yield colorless, thoroughly hardened bodies when irradiated with light, more particularly of a wave length of 2,500 to 4,000 A.

In the following examples the unsaturated polyesters are prepared as follows.

To a 5-liter flask provided with a stirrer, reflux cooler, inert gas injection system and thermometer the reagents propylene glycol, phthalic anhydride, fumaric acid and, when desired, triphenylphosphite are charged. Heating is started by passing through a nitrogen stream and gradually increasing the temperature to 160° C. The temperature is then raised from 160° to 190° C. over a period of about 5–6 hours.

A Marcusson separator is then assembled between the flask and reflux cooler, the temperature is raised to 200° C. and samples are taken and analyzed. The temperature is maintained at 200° C. till the desired viscosity and acid number values are reached.

A nitrogen stream is passed through the mass, the latter is cooled to 150°–160° C. and admixed with hydroquinone, if added, and 500 p.p.m. with respect to the unsaturated polyester, of trimethylbenzyl ammonium chloride. When the mass has cooled to 125° C. it is diluted with styrene containing, where desired, the copper salt. The mass is cooled to room temperature and the characteristics of the unsaturated polyester are determined.

In order to incorporate benzoin in the unsaturated polyester the following procedure was used. Benzoin is melted at 100°–110° C. in the presence of an equivalent quantity by weight of solid bisphenol polyester resin, then allowed to cool and thoroughly crystallize and finely ground. This mixture is hereinafter referred to as the benzoin resin powder. The powder is added to the unsaturated polyester at a temperature of 60°–75° C., with protection from even indirect light, while stirring by means of a nitrogen stream. On completion of the addition, stirring is continued for a few minutes, whereupon the mass is cooled to room temperature and stored.

The stability tests of the unsaturated polyester compositions were carried out by placing the samples in a bath at a controlled temperature of 64±1° C. Each day of stability at this temperature corresponds to a month of stability of the same samples when stored in the dark, out of contact with peroxides and at room temperature (about 20° C.).

To harden the unsaturated polyester compositions, the samples in film form are irradiated with ultraviolet light from a vertical lamp, model 5720B/00 125W(Philips). The thickness of the film stretched on a glass plate is maintained in every case at a constant value of 200 microns. The film is exposed to the action of light at a constant distance of 10 cm. over 5 minutes, and subsequently for 5 further minutes after the sample has been rotated through 90° to its former position. 30 minutes after the end of irradiation the hardness of the sample is measured by means of a Koening pendulum. Using the procedure described above, polycondensation was carried out using the polyester components listed in the table, and adding the additives stated. The properties of the resultant compositions are also given.

Examples 1 to 3 and 5 illustrate the prior art. It will be seen that the storage stability of all the compositions of the invention is improved over the prior art compositions.

member selected from the group consisting of copper naphthenate and copper octoate; and c. from 0.1 to 5.0 percent, by weight of said polyester, of a compound selected from the group consisting of benzoin and benzoin derivatives having an alkyl group containing one to eight carbon atoms in the alpha position.

2. The composition of claim 1, wherein said polycarboxylic acid is partially replaced by a saturated dicarboxylic acid.

3. Compositions as claimed in claim 1, wherein the vinyl monomer is styrene.

4. Compositions as claimed in claim 1, wherein the polycondensation product has a hydroxyl number of 55 to 75.

5. Compositions as claimed in claim 1, characterized by the fact that the phosphite is selected from trimethylphosphite, triethylphosphite and triphenylphosphite.

TABLE

| Example No. | 1 | 2 | 3 | 4 | 5 | 6 | 7 | 8 | 9 | 10 | 11 | 12 | 13 |
|---|---|---|---|---|---|---|---|---|---|---|---|---|---|
| Polyester components: | | | | | | | | | | | | | |
| Propylene glycol (mols) | 1.96 | 1.96 | 1.96 | 1.96 | 1.83 | | | | | | | 1.96 | 1.83 |
| Fumaric acid (mols) | 1.00 | 1.00 | 1.00 | 1.00 | 1.00 | | | | | | | 1.00 | 1.00 |
| Phthalic anhydride (mols) | 0.78 | 0.78 | 0.78 | 0.78 | 0.78 | | | | | | | 0.78 | 0.78 |
| Styrene * | Present (see footnote) | | | | | Same as Example 5 | | | | | | See footnote | |
| Properties of Polyester: | | | | | | | | | | | | | |
| Acid number | 38 | 38 | 47 | 47 | 49.5 | | | | | | | 49.5 | 49 |
| Hydroxyl number | 73 | 73 | 69 | 69 | 56 | | | | | | | 56 | 40 |
| **Additives (by weight of polyester): *** | | | | | | | | | | | | | |
| Benzoin-resin powder percent | 2 | 2 | 2 | 2 | 2 | 2 | 2 | 2 | 2 | 2 | 2 | 2 | 2 |
| Hydroquinone (p.p.m.) | | 100 | 70 | | 70 | | | | | | | 70 | 70 |
| 6% copper naphthenate solution (p.p.m.) | | 20 | | 20 | | 10 | 20 | 30 | 40 | 50 | 60 | 20 | 20 |
| Triphenyl phosphite (p.p.m.) | | | 600 | 600 | 600 | 600 | 600 | 600 | 600 | 600 | 600 | 600 | 600 |
| p-tert-Butyl catechol | | | | | 50 | 50 | 50 | 50 | 50 | 50 | 50 | | |
| **Properties of composition: ** | | | | | | | | | | | | | |
| Gardner viscosity (25° C.) | W- | W- | W | W | W | | | | | | | W+ | W |
| Acid number | 25.7 | 25.7 | 32 | 32 | 34.6 | | | | | | | 26 | 32 |
| Dry residue (percent) | 69 | 69 | 68.8 | 68.8 | 70 | | | | | | | 65.6 | 65.3 |
| Storage stability at 25° C. (days) | 15 | 15 | 15 | 90 | 15 | 75 | 75 | 75 | 75 | 60 | 45 | 45 | 35 |

*The styrene was added in amount to give the stated properties to the composition: in examples 1 and 2, the styrene constituted one part by weight per two parts of the product formed from the propylene glycol, fumaric acid and phthalic anhydride.)

**The composition of example 4 had, after hardening, a Koening hardness of 115 inches.)

***In all cases 500 p.p.m. of trimethylbenzyl ammonium chloride were included.)

What is claimed is:

1. Stable and photochemically hardenable unsaturated polyester compositions comprising:
   a. an unsaturated polyester prepared by mixing (1) a monomer selected from the group consisting of monomers of the acryl and vinyl types with (2) a polycondensation product of a hydroxyl number not below 40, formed from a polycarboxylic and a polyhydroxylic alcohol, wherein the acid or alcohol contains non aromatic unsaturation, said acryl or vinyl monomer being employed in a quantity of from 20 to 70 percent by weight with respect to the polycondensation product,
   b. a stabilizing system composed of 200 to 800 p.p.m. by weight of the polyester of a phosphite selected from the group consisting of alkyl phosphites and aryl phosphites, and from 10 to 50 p.p.m. of a 6 percent solution of a 6. Stable and photochemically hardenable unsaturated polyester compositions comprising:
   a. an unsaturated polyester prepared by mixing (1) a monomer selected from the group consisting of monomers of the acryl and vinyl types with (2) a polycondensation product of a hydroxyl number ranging from 55 to 75, formed from a polycarboxylic acid and a polyhydroxylic alcohol, wherein the acid or alcohol contains nonaromatic unsaturation, said acryl or vinyl monomer being employed in the quantity of from 20 percent of from 70 percent by weight with respect to the polycondensation product;
   b. a stabilizing system composed to from 200 to 800 p.p.m. by weight of a polyester, a phosphite selected from the group consisting of alkyl phosphites and aryl phosphites, and 10 to 50 p.p.m. of a solution of a member selected from the group consisting of 6 percent copper naphthenate and copper octoate; and
   c. from 0.1 to 5.0 percent, by weight, of a polyester of a compound selected from the group consisting of benzoin and benzoin derivatives having an alkyl group containing from one to eight carbon atoms in the alpha position.

* * * * *